United States Patent [19]

Saitoh

[11] Patent Number: 5,444,499

[45] Date of Patent: Aug. 22, 1995

[54] AUDIO VIDEO APPARATUS WITH INTELLIGENCE FOR LEARNING A HISTORY OF USER CONTROL

[75] Inventor: Mitsumasa Saitoh, Kanagawa, Japan

[73] Assignee: Sony Corporation, Tokyo, Japan

[21] Appl. No.: 170,799

[22] Filed: Dec. 21, 1993

[30] Foreign Application Priority Data

Jan. 8, 1993 [JP] Japan .................................. 5-017940

[51] Int. Cl.$^6$ ............................................ H04N 5/44
[52] U.S. Cl. .................................... 348/734; 348/906; 348/1; 348/211
[58] Field of Search .................. 348/906, 2, 1, 211, 348/213, 734; H04N 7/00, 7/10, 5/44

[56] References Cited

U.S. PATENT DOCUMENTS

| | | | |
|---|---|---|---|
| 4,706,121 | 11/1987 | Young | 348/906 |
| 4,930,011 | 5/1990 | Kiewit | 348/2 |
| 4,977,455 | 12/1990 | Young | 348/906 |
| 5,068,734 | 11/1991 | Beery | 348/734 |
| 5,251,324 | 10/1993 | McMullan, Jr. | 348/1 |

Primary Examiner—James J. Groody
Assistant Examiner—Cheryl Cohen
Attorney, Agent, or Firm—Jay H. Maioli

[57] ABSTRACT

A television receiver can output advice information to the viewer when the viewer risks missing a favorite broadcasting program. This television receiver includes in its control unit a timer for obtaining day and time data, a calculating circuit for compiling broadcasting station number currently being viewed by using the time information as parameters, and a weekly tuning information storage unit for storing therein data representing a personal weekly viewing trend on the basis of the compiled result, in which, when it is determined that present tuning data read out from the weekly tuning information storage unit and the present tuning broadcasting station are not coincident with each other, advice information is supplied to the viewer in the form of displayed message or sound message before or after that time.

13 Claims, 6 Drawing Sheets

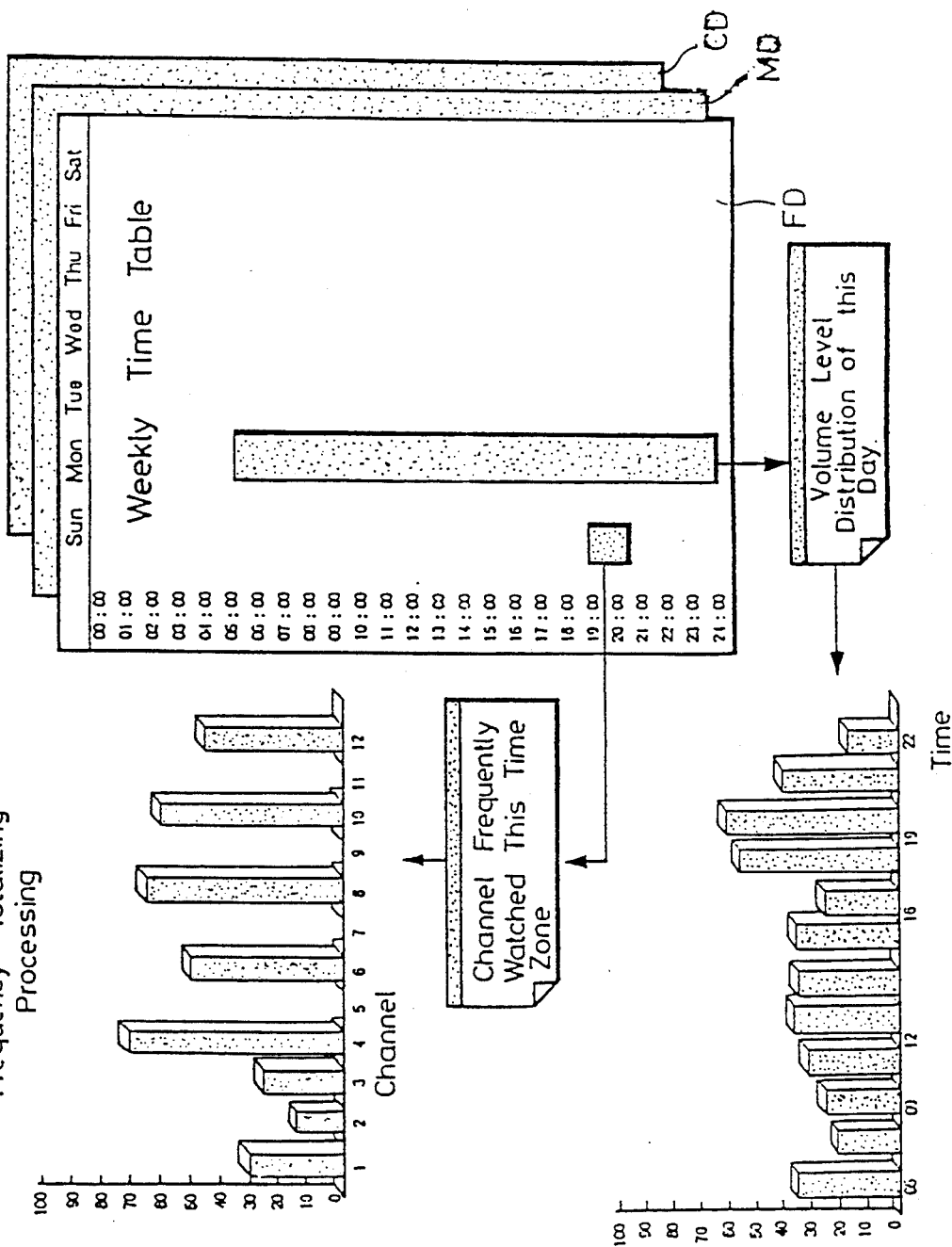

5,444,499

AUDIO VIDEO APPARATUS WITH INTELLIGENCE FOR LEARNING A HISTORY OF USER CONTROL

BACKGROUND OF THE INVENTION

1. Field of the Invention

The present invention relates to television receivers and, more particularly, is directed to a television receiver in which information concerning the viewer's life style is obtained.

2. Description of the Related Art

Existing television receivers receive BS programs in addition to general UHF programs or are used as monitors to display pictures of VTR (video tape recorder), a laser disk or teletext. Also, when in use, existing television receivers are operated in accordance with a viewer's life style. For example, there is a trend that television programs that viewers watch in a certain time zone are fixed at every week and/or day in accordance with viewer's life style, such as those who watch an education program of broadcasting station A early in the morning at every certain day of every week and those who regularly watch a documentary broadcast by broadcasting station C on a particular day after a particular news program broadcast by broadcasting station B at night.

It is frequently observed that viewers having such life styles will miss favorite programs if they enjoy a video program from the VTR or watch a sports program broadcast by another broadcasting station until their favorite program is started after the television receiver had been powered on.

In such case, if the television receiver is programmed to operate in the timer-activated recording mode, then it is possible to solve the above-mentioned problem that the viewer will miss the favorite television program. However, a timer-activated recording is generally cumbersome in operation. There is then the trend that most of the viewers do not use such timer-activated recording functions inasmuch as a television program is not of great importance to the viewer.

OBJECTS AND SUMMARY OF THE INVENTION

Therefore, it is an object of the present invention to provide an improved television receiver in which the aforementioned shortcomings and disadvantages encountered with the prior art can be eliminated.

More specifically, it is an object of the present invention to provide a television receiver in which viewers can be prevented from missing desired programs inadvertently.

It is another object of the present invention to provide a television receiver in which viewers can select desired television channels with ease.

According to a first aspect of the present invention, there is provided an audio video apparatus with intelligence for learning a history of user control which comprises a control circuit for controlling an operation of an apparatus, a memory means for memorizing a program and/or data of the control circuit, a user control circuit controlled by a user, and a signal generating circuit for generating a signal for getting the attention of the user.

According to a second aspect of the present invention, there is provided a television receiver with intelligence for learning a history of user control which comprises a display device for displaying a picture, a video processing circuit for processing a video signal, a loudspeaker for generating a sound signal, a sound generating circuit for processing the sound signal, a control circuit for controlling an operation of an apparatus, a memory for memorizing a program and/or data of the control circuit, a user control circuit controlled by a user, and a signal generating circuit for getting the generating a signal for attention of the user.

In accordance with a third aspect of the present invention, there is provided a method of learning a history of user control which comprises the steps of recognizing a present time and/or date and/or day if a user selects a new channel of which time a timer count turns on, memorizing a channel number and the present time and/or date and/or day if a timer count value reaches a predetermined time period and the user does not change the new channel, and calculating data for a frequency in use.

The above and other objects, features, and advantages of the present invention will become apparent from the following detailed description of illustrative embodiments thereof to be read in conjunction with the accompanying drawings.

BRIEF DESCRIPTION OF THE DRAWINGS

FIG. 6 is a schematic diagram showing an example of memorized contents of a personal data memory used in the second embodiment of FIG. 5.

DETAILED DESCRIPTION OF THE PREFERRED EMBODIMENTS

The present invention will now be described with reference to the drawings.

Figure 1:
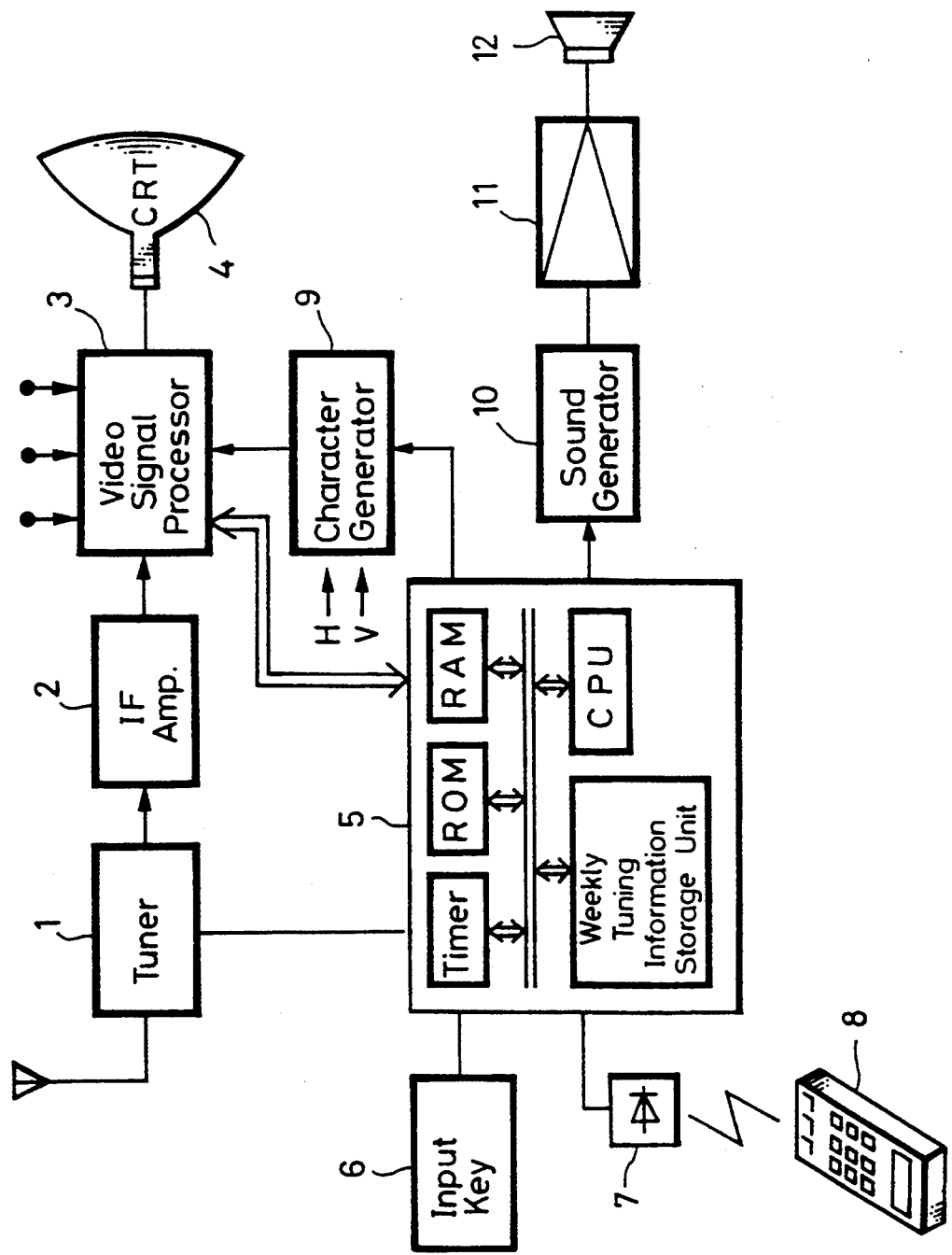
FIG. 1 is a block diagram showing a television receiver according to a first embodiment of the present invention.

FIG. 1 of the accompanying drawings shows a block diagram of an embodiment of a television receiver according to the present invention. In FIG. 1, reference numeral 1 denotes a tuner for selecting a broadcasting station, 2 an intermediate frequency amplifying unit and 3 a video signal processing circuit. The video signal processing circuit 3 processes in a variety of ways a demodulated video signal, such as separating a color signal, forming color difference signals, extracting a synchronizing signal and so on. Also, the video signal processing circuit 3 supplies RGB signals to a CRT (cathode ray tube) 4 which then displays a picture.

There is provided a control unit 5 which supplies control signals to the above-mentioned respective function circuits. The control unit 5 carries out a variety of control operations, such as selection of the broadcasting station, volume up/down, and control of the picture quality or the like on the basis of an operation signal supplied thereto from an input key switch (operation button) 6 or an operation signal supplied thereto from a remote controller 8 through a light sensing device 7.

A character (graphic pattern) generator 9 is adapted to output various information in such fashion that various information are superimposed upon a displayed picture of the CRT 4. The character generator 9 generates characters in order to display the identity of the operations performed when control data is output from the above-mentioned control circuit 5.

According to the television receiver of the present invention, the insertion of a picture, such as one displaying an external video signal, a BS (broadcast from satellite) signal input to the video signal processing circuit 3 in the form of a main picture/sub picture or the like, can be carried out.

The control circuit 5 of the present invention incorporates therein a timer in addition to a CPU (central processing unit), and a semiconductor memory such as a RAM (random access memory), a ROM (read-only memory) or the like to effect a time administration at the unit of one week. Then, on the basis of this time administration, tuning information of the television receiver is memorized in a weekly tuning information storage member as will be described later on.

In FIG. 1, reference numeral 10 denotes a sound generator, 11 an amplifier, and 12 a loudspeaker, all of which are used when advice information is output in the form of sound.

The television receiver according to the present invention includes the above-mentioned respective circuit blocks so that a power switch is turned on or off, a broadcasting station is selected and a sound volume is adjusted by using, for example, a remote controller 8 similar to the ordinary television receiver.

In the television receiver according to the present invention, if it is determined that the viewer becomes able to watch a broadcast program after a certain broadcasting station was selected, then data representing the viewing day, date and the selected broadcasting station are successively compiled by a calculating unit and data representative of a familiar broadcasting station whose program is frequently viewed in daily life can be stored in the weekly tuning information storage unit on the basis of the compiled data.

Figure 2:
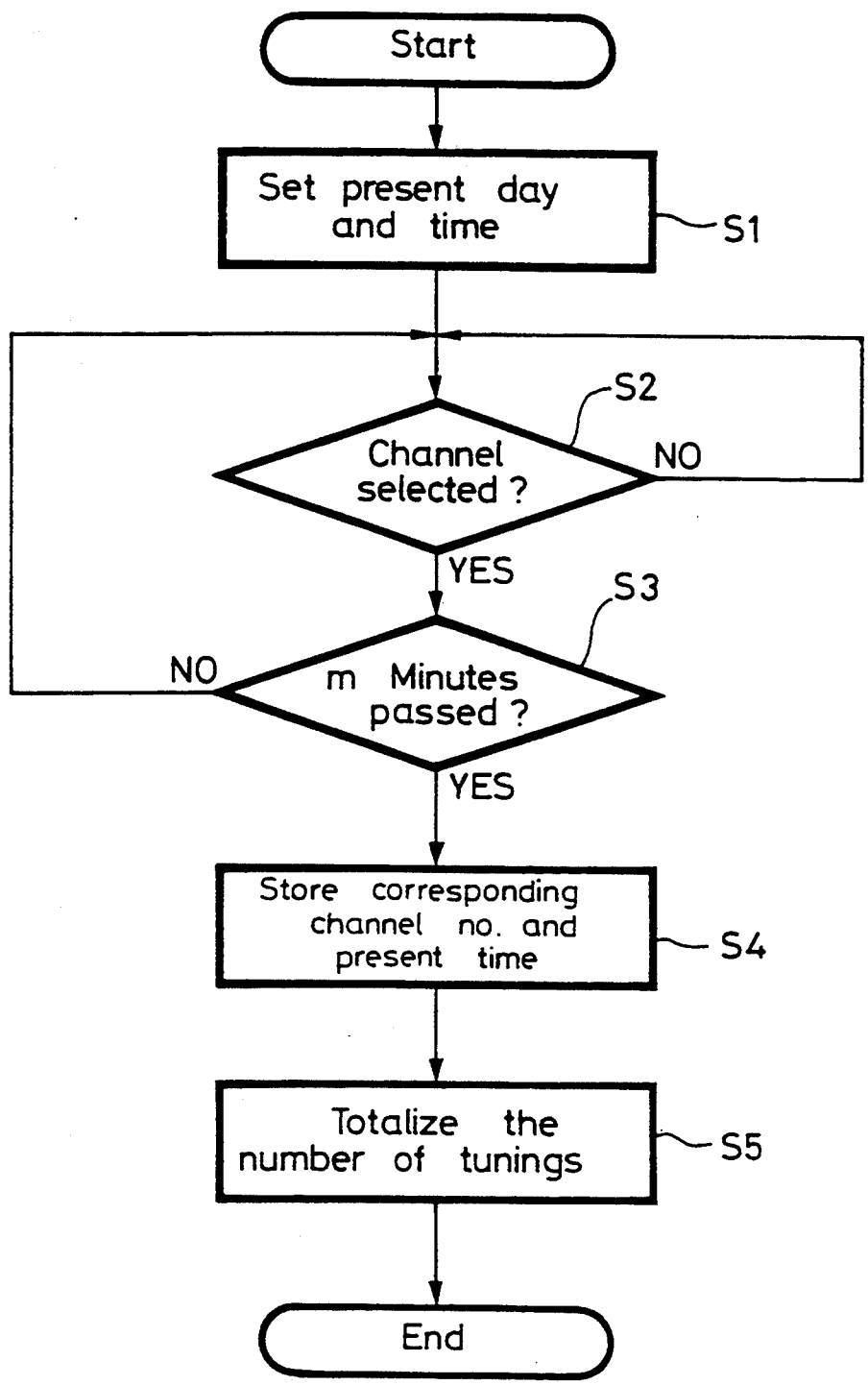
FIG. 2 is a flowchart to which reference will be made in explaining operation of a control unit of a microcomputer in which weekly tuning information is stored according to the first embodiment of the present invention.

More specifically, as shown in a flowchart of FIG. 2, following the start of operation (i.e., when the television receiver is energized), the control unit 5 reads present day data and time data from the timer and sets present day and time in step S1. In the next decision step S2, it is determined whether or not the channel is selected. If the channel is selected, as represented by a YES at decision step S2, then the processing proceeds to the next decision step S3. If a NO is output at decision step S2, step S2 is repeated. It is determined in decision step S3 whether or not predetermined m minutes passed. If the predetermined m minutes passed, as represented by a YES at decision step S3, then it is determined that the viewer becomes able to view a program of this channel, and the processing proceeds to step S4, whereat the corresponding channel number and the present time are stored in the memory. If a NO is output at decision step S3, then the processing returns to decision step S2. In the next step S5, the number of tunings are compiled by using day, time and selected channel as parameters. Alternatively, in step S5, a sound volume in this viewing state may be stored in the memory simultaneously, and the sound volume level also may be added as data together with the broadcasting channel data. Then, the processing is ended.

Therefore, the above-mentioned compiled data can be considered to express the viewer's life style, such as when and what program the user using this television receiver according to this invention views.

Further, if it is determined that the compiled result, e.g., data representative of the number of tunings using day and time as parameters is relatively higher than that of another selected channel, then such data is stored in the above-mentioned weekly tuning information storage unit.

The number of tunings in which the corresponding broadcasting channels are selected in these time periods by those who watch a program of a Japanese chess players' tournament at 10:00 on Sunday morning without fail or those who watch documentaries of a broadcasting station A at 8:00 on Monday evening by using a remote controller or the like is about four to ten times larger than that number of tunings for selecting other broadcasting channels. Then, this selection information is stored in the above-mentioned weekly tuning information storage unit.

Figure 3:
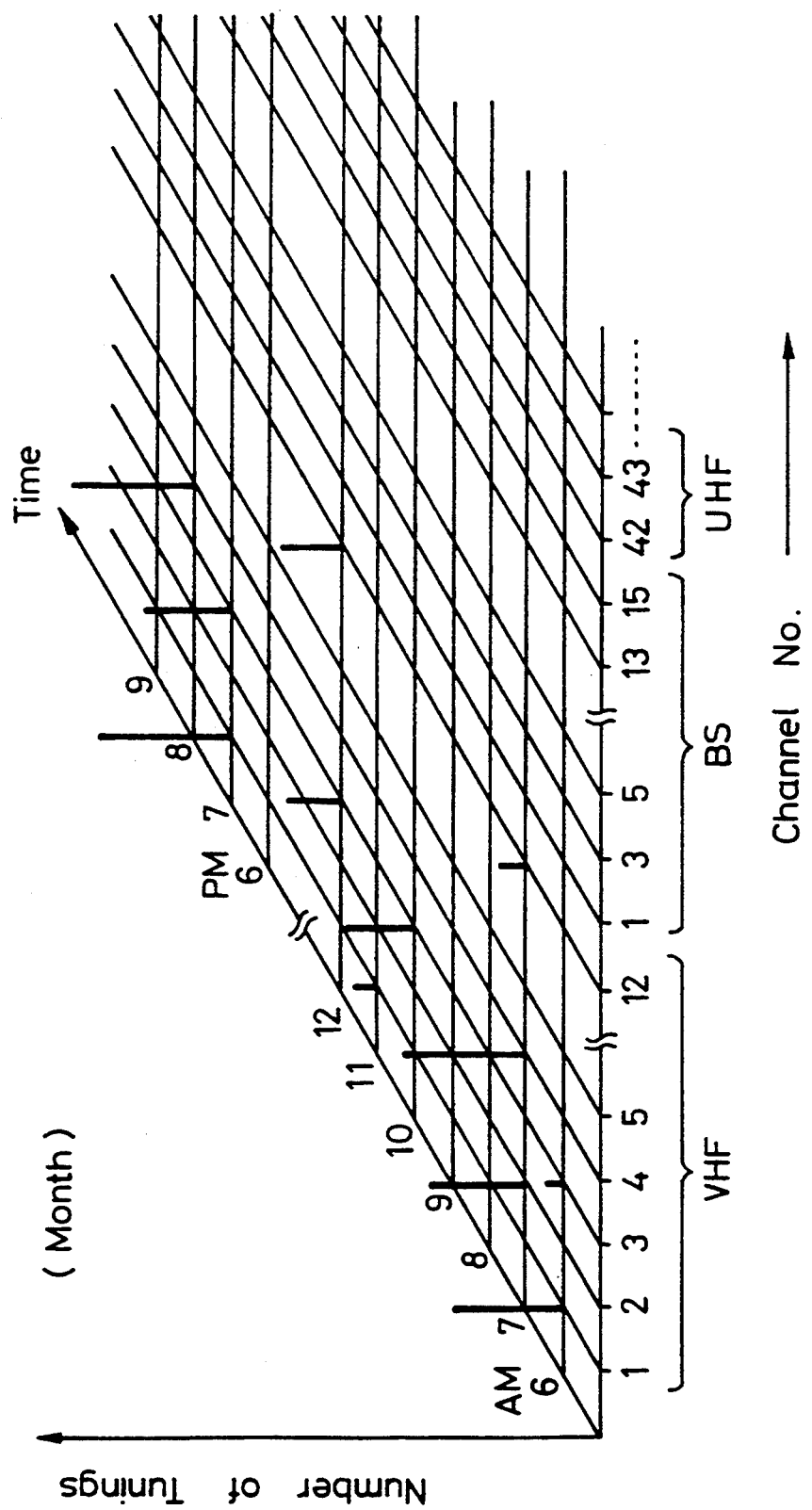
FIG. 3 is a schematic diagram used to explain a frequency of tuning registered in a weekly tuning information memory.

Accordingly, the number of tunings is stored in the weekly tuning information storage unit at its area in which data is stored at every day as height direction data using the broadcasting channel number and the time as address as shown in FIG. 3. Then, data in which the height direction data becomes a predetermined value is stored in the weekly tuning information storage unit.

Figure 4:
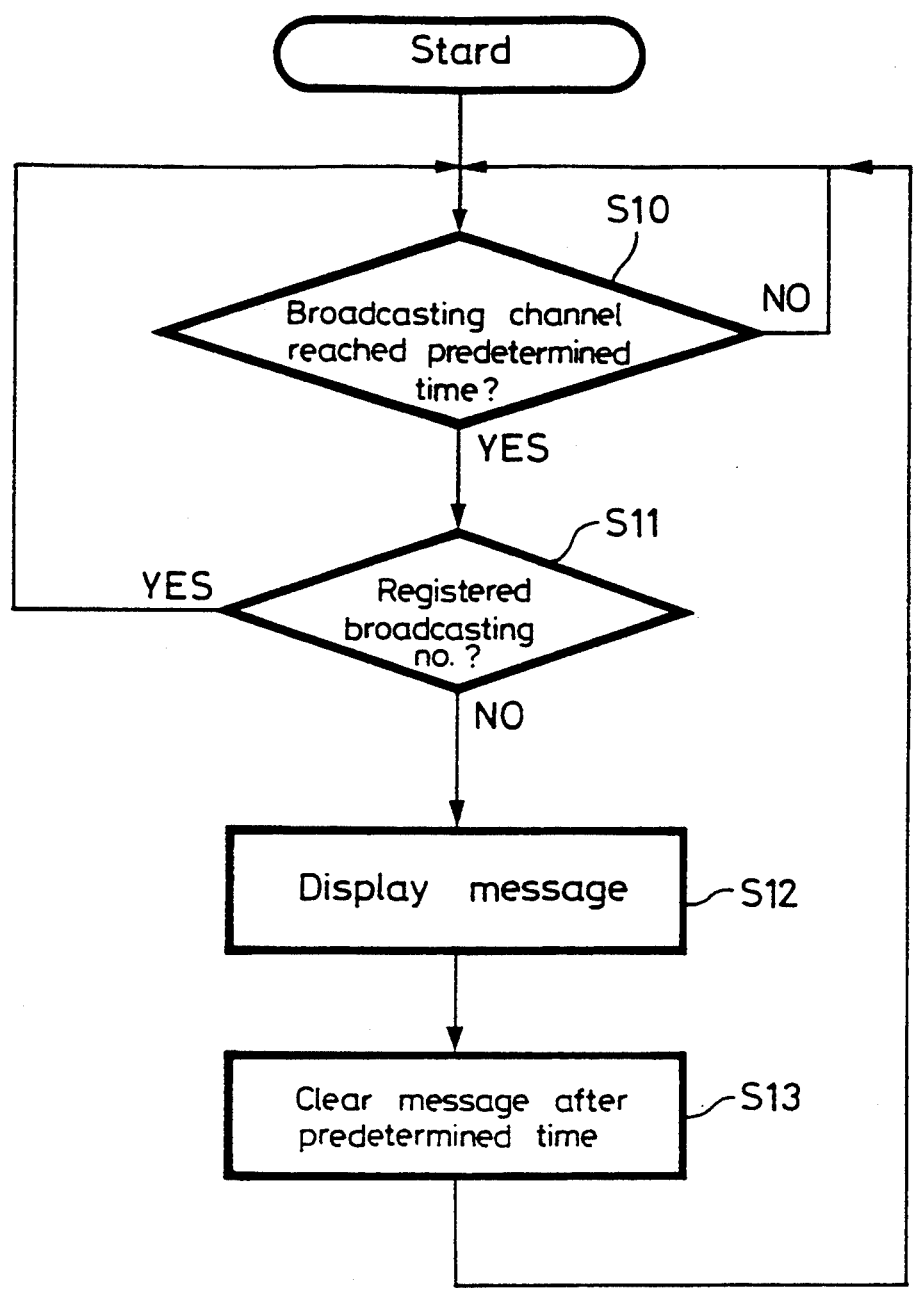
FIG. 4 is a flowchart to which reference will be made in explaining operation done when advice information is formed.

Operation of the television receiver according to the present invention will further be described with reference to a flowchart of FIG. 4. As shown in FIG. 4, following the start of operation, it is determined in decision step S10 whether or not broadcasting channel information stored in the weekly tuning information storage unit reaches a predetermined time of a certain day. If a YES is output at decision step S10, then a registered broadcasting channel number is read out, and the processing proceeds to the next decision step S11, whereat the broadcasting channel number thus read and the present tuning channel number are compared with each other.

If the above-mentioned two channel numbers are not coincident with each other, as represented by a NO at decision step S11, then the processing proceeds to step S12. In step S12, the present time and the registered broadcasting channel are displayed at the corner of the picture screen (may be displayed in a blinking fashion as an advisory message). Then, the displayed message is cleared after a predetermined time in step S13.

Accordingly, when the viewer watches another broadcasting program that is unusual, if the viewer's favorite broadcasting program is output from the above-mentioned weekly tuning information storage unit, then the above advice message is displayed on the picture screen of the television receiver, which informs the viewer that the viewer's favorite television program has just started. Therefore, the viewer can be prevented from missing the viewers favorite broadcasting program.

Incidentally, when the television receiver is placed in the external input state (i.e., a picture from a video tape recorder is being played back on the picture screen of the television receiver), if the power switch is in its off-state, then it is determined on the basis of the compared result that the broadcasting channel number read out is not coincident with the present selected channel. Then, the above-mentioned advice information is displayed on the picture screen of the television receiver. Particularly, when the power switch of the television receiver is in its off-state, it is preferable that the power switch is not turned on to display the above-mentioned advice information on the picture screen of the television receiver and that only the audio circuit shown in FIG. 1 is energized to output notice information to the sound generator 10 so as to produce, for example, a sound message "at 9:00, NHK (Nippon Hoso Kyokai) News program now begins".

Furthermore, it is preferable that the broadcasting channel that is output when the television receiver is first turned on becomes the broadcasting channel registered in the above-mentioned weekly tuning information storage unit under the control of the control unit.

Figure 5:
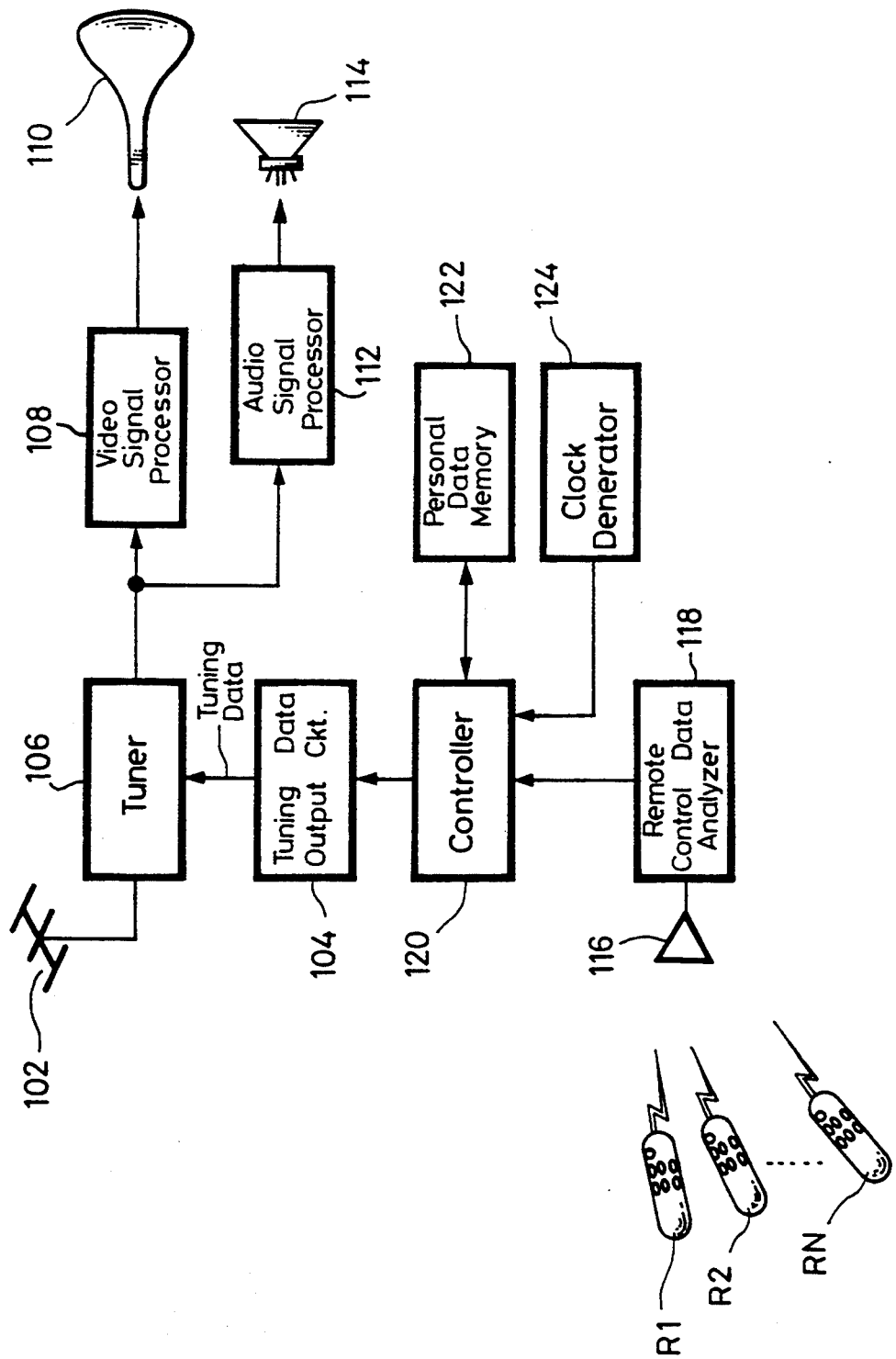
FIG. 5 is a block diagram showing the television receiver according to a second embodiment of the present invention.

FIG. 5 is a schematic block diagram showing a circuit arrangement of a second embodiment of the television receiver according to the present invention. As shown in FIG. 5, there is provided an antenna 102 to which a number of television signals are supplied. Of these television signals, a tuner 106 receives a television signal of a channel instructed by tuning data output from a tuning data output circuit 104. A video signal in the television signal received by the tuner 106 is processed by a video signal processing circuit 108 and a picture represented by such processed video signal is displayed on a CRT 110 thereby. An audio signal in the television signal received by the tuner 106 is processed by an audio signal processing circuit 112 and a sound represented by such processed audio signal is emanated from a loudspeaker 114.

Personal remote controllers R1, R2, . . . , RN are respectively prepared as, for example, father's remote controller, mother's remote controller, . . . , N'th child's remote controller. When these personal remote controllers R1, R2, . . . , RN emit signals for operating the television receiver, they generate signals representing identification (ID) codes ID1, ID2, . . . , IDN which are different from one another. Output signals (infrared-ray signals) from the personal remote controllers R1, R2, . . . , RN are received by a receiving unit 116 and then analyzed by a remote control data analyzer 118.

The remote control data analyzer 118 analyzes not only tuning data, sound volume data and so on provided when the personal remote controllers R1, R2, . . . , RN are operated by the respective viewers to effect the tuning control and the sound volume control but also the identification codes ID1, ID2, . . . , IDN output from the personal remote controllers R1, R2, . . . , RN. Then, the remote control data analyzer 118 supplies analyzed data to a controller 120. The controller 120 learns the favorite channels of respective viewers and compiles the number of channels that are watched by respective viewers during respective time zones in accordance with a weekly time table with reference to clock data generated by a clock generator to thereby make channel priority order data of each time zone for every viewer. Channel priority order data thus made are stored in a personal data memory 122.

Further, the controller 120 learns the favorite volume of each viewer and compiles the number of viewers' favorite volumes in respective time periods in accordance with the weekly time table with reference to a clock generated from the clock generator 124 to thereby make volume distribution data of respective time zones for every viewer. Volume distribution data thus made are stored in the personal data memory 122.

FIG. 6 shows an example of contents of data stored in the personal data memory 122 used in the second embodiment of FIG. 5. In this example, there are stored a father's personal totalized data table FD, a mother's personal totalized data table MD and a child's personal totalized data table CD. Each of the tables FD, MD and CD includes channel priority order data at every time zone and volume level distribution data at every time zone per day. An upper left graph of FIG. 6 shows a father's channel priority order from 19:00 to 20:00. A lower left graph of FIG. 6 shows a daily volume distribution on Monday.

When the television receiver is turned on by any one of the personal remote controllers R1, R2, . . . , RN, the remote controller data analyzer 118 checks the identification code output from the corresponding personal remote controller and supplies a checked result to the controller 120. The controller 120 specifies on the basis of the reported identification code a viewer who had operated the personal remote controller. Then, the controller 120 reads out from the personal compiled data table of the specified viewer from the personal data memory 122, and supplies tuning data representing the channel whose priority order is highest in that time zone through the tuning data output circuit 104 to the tuner 106 in response to the clock supplied thereto from the clock generating circuit 124. Therefore, the viewer can watch their favorite program of a particular time merely by turning on the television receiver.

Further, the controller 120 reads out the personal compiled data table of the specified viewer from the personal data memory 122 to check a past volume in that time zone and controls the audio signal processing circuit 112 such that a sound of the same volume thus checked is produced from the loudspeaker 114.

As described above, according to the above-mentioned second embodiment, the viewer can select the favorite channel and volume without carrying out cumbersome tuning operation and volume adjusting operation.

Incidentally, if a channel-up operation and a channel-down operation of the remote controller are carried out in order to select the priority order, then a channel can be selected more easily.

As described above, under normal conditions of use, since the television receiver according to the present invention checks the viewer's program watching trend in one-week units, stores viewer's favorite program data in the weekly tuning information storage unit and compares the broadcasting channel program registered in the weekly tuning information storage unit with the present selected channel program by using day and time zone as parameters so that, only if they are not coincident, notice information is output, the viewer can be prevented from inadvertently missing either a favorite program that the viewer watches habitually or an interesting serial teleplay.

Furthermore, since the television receiver according to the present invention include the storage means for storing the channel priority order for each viewer, detects a viewer who operates the television receiver, reads out channel data having highest priority order for the detected viewer and communicates the read-out channel to the tuner, even a plurality of viewers can select favorite channels with ease.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An audio video apparatus with intelligence for learning a history of user control of the audio video apparatus, comprising:

a user control unit actuated by a user for producing signals representing user-selected display functions including video channel selection and audio volume for the apparatus;

control means for receiving the signals produced by the user control unit and for controlling the display functions of the apparatus;

memory means for successively memorizing the user-selected display functions represented in the signals received by the control means each time the user control unit is actuated;

a timer for timing a predetermined unit of time;

calculating means receiving memorized data from the memory means and connected to said timer for compiling the data to form history data of user-selected display functions over said predetermined unit of time, said history data being fed to said control means for generating a control signal therefrom; and signal generating means for generating an advisory signal for getting the attention of the user in response to said control signal from the control means.

2. An audio video apparatus with intelligence for learning a history of user control of the audio video apparatus as claimed in claim 1, wherein the advisory signal is a video signal.

3. An audio video apparatus with intelligence for learning a history of user control of the audio video apparatus as claimed in claim 1, wherein the advisory signal is an audio signal.

4. A television receiver with intelligence for learning a history of user control of the television receiver, comprising:

display means for displaying a picture of a program;

video processing means for processing a video signal for display by the display means;

sound generating means for generating a sound signal;

a loudspeaker for producing a sound in response to the sound signal;

a user control unit actuated by a user for producing signals representing user-selected functions including channel selections for the receiver;

control means for receiving the signals produced by the user control unit and for controlling the function of the receiver in response to the signals;

memory means for successively memorizing the user-selected functions represented in the signals received by the control means each time the control unit is actuated;

a timer for timing a predetermined unit of time;

calculating means receiving data from the memory means and connected to the timer for compiling the data to form history data of user-selected functions over the predetermined unit of time, the history data being fed to the control means for generating a control signal therefrom; and signal generating means for generating an advisory signal for getting the attention of the user in response to the control signal from the control means.

5. A television receiver with intelligence for learning a history of user control of the television receiver as claimed in claim 4, wherein said advisory signal for getting the attention of the user is a video signal.

6. A television receiver with intelligence for learning a history of user control of the television receiver as claimed in claim 4, wherein said advisory signal for getting the attention of the user is an audio signal.

7. A television receiver with intelligence for learning a history of user control of the television receiver as claimed in claim 4, further comprising a tuner for receiving an RF broadcasted signal, an intermediate frequency amplifier for amplifying an intermediate frequency signal, and an IR receiving means for receiving an IR signal from a remote controller.

8. A television receiver with intelligence for learning a history of user control of the television receiver as claimed in claim 7, further comprising personal data memory means for memorizing data of a plurality of users.

9. A method of learning a history of user control of an audio video apparatus comprising the steps of:

recognizing a present time and day each time a user selects a new channel for the audio video apparatus and turning on a timer count;

successively memorizing the selected channel number and the present time and day if the timer count reaches a predetermined time period before the user changes the channel again;

calculating historical data corresponding to the frequency of the user's selection of the selected channel to determine a registered channel;

comparing the selected channel and the present time and day to the registered channel corresponding to the present time and day when a predetermined time elapses after each time the user selects a channel; and displaying an advisory message to the user if the selected channel is not the same as the registered channel corresponding to the present time and day.

10. A method of learning a history of user control of the audio video apparatus as claimed in claim 9, further comprising the step of successively memorizing the volume at which the television receiver is set each time the selected channel and the time and day are memorized.

11. A method of learning a history of user control as claimed in claim 9, further comprising the step of memorizing the identity of the user who uses the apparatus each time the selected channel and the time and day are memorized.

12. A method of learning a history of user control as claimed in claim 9, further comprising the step of generating an advisory sound message to the user if the selected channel is not the same as registered channel corresponding to the present time and day.

13. A method of learning a history of user control as claimed in claim 10, further comprising the step of turning off the advisory message at a predetermined time after the message was initially displayed.

* * * * *

UNITED STATES PATENT AND TRADEMARK OFFICE
CERTIFICATE OF CORRECTION

PATENT NO. : 5,444,499
DATED : August 22, 1995
INVENTOR(S) : Mitsumasa SAITOH

It is certified that error appears in the above-indentified patent and that said Letters Patent is hereby corrected as shown below:

In the Abstract, line 7, change "number" to --numbers--

Col. 2, line 13, change "of" to --at--

Col. 8, line 46, change "not-the" to not the--

Signed and Sealed this

Seventh Day of January, 1997

Attest:

BRUCE LEHMAN

*Attesting Officer*    *Commissioner of Patents and Trademarks*